(12) United States Patent
Yamaguchi et al.

(10) Patent No.: US 7,258,760 B2
(45) Date of Patent: Aug. 21, 2007

(54) METHODS OF FORMING HONEYCOMB SANDWICH COMPOSITE PANELS

(75) Inventors: Eikatsu Yamaguchi, Tokyo-To (JP); Seiji Maruyama, Tokyo-To (JP)

(73) Assignee: Fuji Jukogyo Kabushiki Kaisha (JP)

( * ) Notice: Subject to any disclaimer, the term of this patent is extended or adjusted under 35 U.S.C. 154(b) by 461 days.

(21) Appl. No.: 10/832,609

(22) Filed: Apr. 27, 2004

(65) Prior Publication Data
US 2004/0200571 A1 Oct. 14, 2004

Related U.S. Application Data

(62) Division of application No. 09/453,055, filed on Dec. 2, 1999, now Pat. No. 6,776,865.

(30) Foreign Application Priority Data
Dec. 2, 1998 (JP) .................... 10-343231

(51) Int. Cl.
*B29C 47/00* (2006.01)
(52) U.S. Cl. .............. 156/245; 156/307.1; 156/307.7; 428/116
(58) Field of Classification Search .............. 156/245, 156/307.1, 307.7; 428/116
See application file for complete search history.

(56) References Cited

U.S. PATENT DOCUMENTS

| 4,323,623 A | 4/1982 | Ahrens et al. |
| 4,861,649 A | 8/1989 | Browne |
| 4,968,545 A | 11/1990 | Fellman et al. |
| 5,431,995 A | 7/1995 | Narita et al. |
| 5,567,499 A | 10/1996 | Cundiff et al. |
| 5,665,787 A * | 9/1997 | Nowak et al. ............... 521/54 |
| 6,776,865 B1 * | 8/2004 | Yamaguchi et al. ........ 156/245 |

FOREIGN PATENT DOCUMENTS

| EP | 588437 A * | 3/1994 |
| EP | 0 786 330 A2 | 7/1997 |

OTHER PUBLICATIONS

Lubin, George, "Handbook of Composites," 1982, pp. 755-778, Van Nostrand Reinhold Company, New York, NY.

\* cited by examiner

*Primary Examiner*—Jeff H. Aftergut
(74) *Attorney, Agent, or Firm*—Smith, Gambrell & Russell, LLP

(57) ABSTRACT

The invention is to perform operations from sealing of a honeycomb core with a thermosetting sealing material having an adhesive property to its hardening in one step, prevent a resin from flowing into cells of the honeycomb core during resin impregnating operation, and thereby mold low-cost honeycomb sandwich components by using RTM technique which is adopted in molding solid materials, for instance. Dry fabric sheets are stacked on both sides of a honeycomb core with thermosetting sealing members having an adhesive property placed in between, and the sealing members and the dry fabric sheets are heated at the curing temperature of the sealing members to cause initial hardening of the sealing members and to dry the dry fabric sheets. Then, the dry fabric sheets are impregnated with a thermosetting resin and the resin impregnated into the dry fabric sheets is hardened by hot-pressing an entire assembly thus prepared under specific conditions.

15 Claims, 4 Drawing Sheets

METHODS OF FORMING HONEYCOMB SANDWICH COMPOSITE PANELS

REFERENCE TO RELATED APPLICATION

This application is a divisional of our application, Ser. No. 09/453,055 filed Dec. 2, 1999, now U.S. Pat. No. 6,776,865, which is relied on and incorporated by reference.

BACKGROUND OF THE INVENTION

1. Field of the Invention

The present invention relates to lightweight high-stiffness composite panels used in aircraft, motor vehicles, vessels, buildings, or general industrial equipment. More particularly, it is concerned with methods of forming composite panels having a honeycomb sandwich structure by using an RTM (Resin Transfer Molding) process.

2. Description of the Related Art

Previously known methods of forming honeycomb sandwich panels include a molding method in which outside plates previously formed as skins are placed on top and bottom surfaces of a honeycomb core with an adhesive applied between them and the outside plates and the honeycomb core are bonded together under heat and pressure, as well as a molding method in which prepreg sheets and a honeycomb core are stacked by hand lay-up operation with an adhesive applied between them, the prepreg sheets and honeycomb core thus stacked are covered with a vacuum bag, an internal space of the vacuum bag is drawn by vacuum, and then the stack is subjected to heat and pressure by using a hot press or an autoclave.

In addition, Japanese Patent Laid-Open No. 295362/1997 describes a method of forming a honeycomb sandwich panel by the RTM process, in which an impregnating resin is kept from flowing into a honeycomb core by use of a resin/moisture barrier film formed of a particular macromolecular film.

Since the aforementioned method of forming honeycomb sandwich panels utilizes prepreg as a raw material, it requires high material cost and expensive facilities for the storage of materials and for a curing operation. Further, this method involves many processing steps, and this would develop a problem of cost reduction of composite materials.

In the aforementioned RTM process for forming a honeycomb sandwich panel by use of a particular macromolecular film, it is necessary to apply an adhesive to both sides of the macromolecular film because outside plates and a honeycomb core are bonded with the macromolecular film (thermoplastic resin) placed between them. As a method of forming alternative panels for existing sandwich panels, the RTM process would pose new problems, such as an increase in weight due to the use of additional material.

Furthermore, when a panel of a complex shape having a steplike portion or a curved surface, for instance, is formed by the aforementioned method of forming the honeycomb sandwich panel that uses the macromolecular film, it is difficult for a finished panel to keep its shape and the desired shape will not easily be obtained due to poor adhesion and low flexibility of the macromolecular film. Moreover, sealing performance against resin would become insufficient and the stiffness of the finished panel would deteriorate.

SUMMARY OF THE INVENTION

The present invention has been made in view of the aforementioned problems. Accordingly, it is an object of the invention to provide a method of forming honeycomb sandwich composite panels in which a honeycomb core is sealed in a mold prior to resin impregnation to prevent the resin from flowing into cells of the honeycomb core during resin impregnating operation in order that the RTM technique adopted in molding solid materials (plate materials), for instance, can be used.

According to a method of forming a honeycomb sandwich composite panel, a dry fabric is stacked on both sides of a honeycomb core with a thermosetting sealing material having an adhesive property placed in between, and the sealing material and the dry fabric are heated at the curing temperature of the sealing material to cause initial hardening of the sealing material and to dry the dry fabric. Subsequently, the dry fabric is impregnated with a thermosetting resin and the resin impregnated into the dry fabric is hardened by hot-pressing an entire assembly thus prepared under specific conditions. According to this method, it is possible to perform operations from the sealing of the honeycomb core with the sealing material to its hardening in one step, prevent the resin from flowing into cells of the honeycomb core during resin impregnating operation, and thereby produce low-cost honeycomb sandwich components.

According to another method of forming a honeycomb sandwich composite panel, a dry fabric is stacked on both sides of a honeycomb core with a thermosetting sealing material having an adhesive property placed in between, and the sealing material is hardened by heating the sealing material and the dry fabric to the curing temperature of the sealing material and maintaining this temperature for a specified period of time. Subsequently, the dry fabric is impregnated with a thermosetting resin while varying the temperature of the sealing material and the dry fabric to a resin impregnating temperature and maintaining this temperature for a specified period of time, and the resin impregnated into the dry fabric is hardened by heating the sealing material and the dry fabric to the curing temperature of the thermosetting resin and hot-pressing them for a specified period of time. According to this method, it is possible to prevent the resin from flowing into cells of the honeycomb core during resin impregnating operation and mold low-cost honeycomb sandwich components by using the RTM technique which is adopted in molding solid materials, for instance.

DESCRIPTION OF THE PREFERRED EMBODIMENTS

Embodiments of the invention are described below with reference to the drawings.

Figure 1:
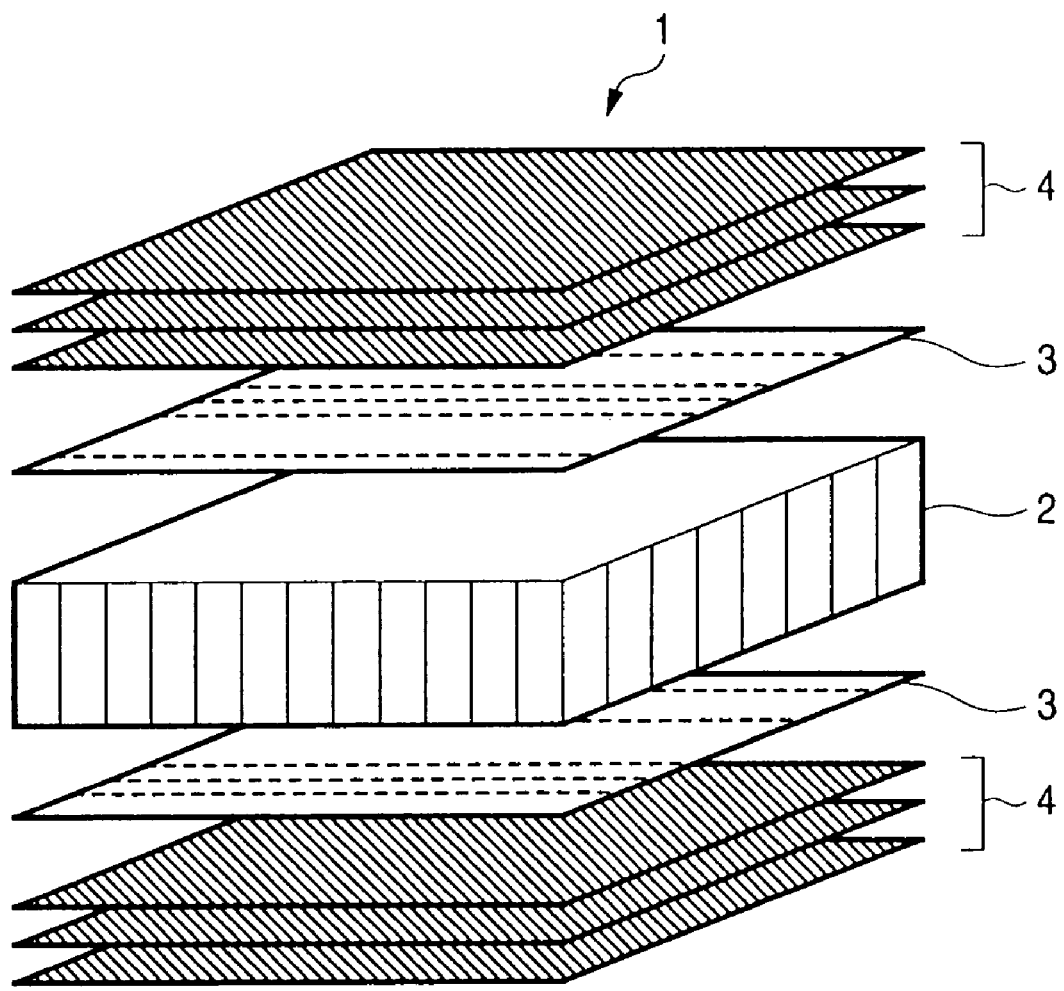
FIG. 1 is a diagram showing a lamination process according to a method of forming a honeycomb sandwich composite panel of the invention.

FIG. 1 shows laminating materials and a lamination method used in a method of forming a honeycomb sandwich composite panel according to the invention. The honeycomb sandwich composite panel 1 is formed of a honeycomb core 2, sealing members 3 placed on both sides of the honeycomb core 2, and a plurality of dry fabric sheets 4 placed on top of the individual sealing members 3. These dry fabric sheets 4 are impregnated with a resin. The honeycomb core 2 and the dry fabric sheets 4 have the same structures that have conventionally been used in this kind of honeycomb sandwich composite panel.

It is preferable that the sealing members 3 have the ability to harden in a temperature range lower than recommended curing temperature as well as heat resistance to withstand high temperatures falling within a temperature range in which the impregnating resin is cured from the viewpoint of efficiency in manufacturing the honeycomb sandwich composite panel 1. It is also preferable that the sealing members 3 have a sufficient sealing effect to prevent the resin from flowing into the honeycomb core during resin impregnation and that adhesion between the honeycomb core and outside sheets be strong enough and the sealing members 3 be of a kind of material which would not become a dissimilar material when they are joined into a single structure. Further, when the impregnating resin is a thermosetting resin, the sealing members 3 should preferably include a thermosetting epoxy resin capable of curing at a temperature between 120° C. and 180° C.

Specific structures of the sealing members 3 are shown in FIGS. 3 to 6.

Figure 3:
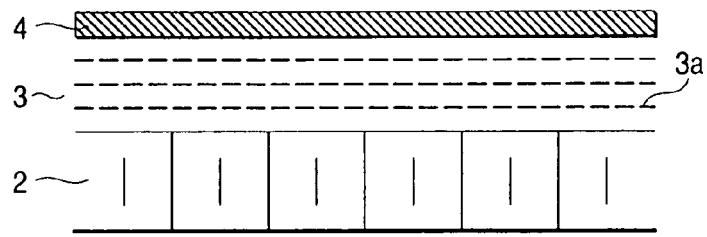
FIG. 3 is a diagram showing an example of a sealing member for use in the honeycomb sandwich composite panel of FIG. 1.

The sealing member 3 shown in FIG. 3 has a three-layered structure of thermosetting resin films 3a whose viscosity is increased by adding glass microbaloons to an epoxy resin material, in which the viscosity of the resin can be adjusted by the amount of the glass microbaloons added. Alternatively, short fibers or non-woven fabric of glass may be used instead of the glass microbaloons.

Figure 4:
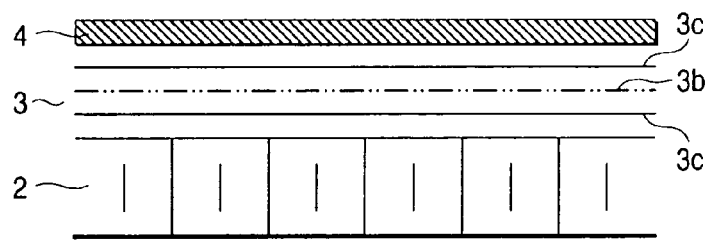
FIG. 4 is a diagram showing another example of a sealing member for use in the honeycomb sandwich composite panel of FIG. 1.

The sealing member 3 shown in FIG. 4 is produced by sandwiching a carrier material 3b which is used as an adhesive film between epoxy resin adhesive films 3c. Passage of the resin is impeded by the size of openings formed between fibers, and this makes it possible to control sagging and flow-out of the resin into the honeycomb core.

Figure 5:
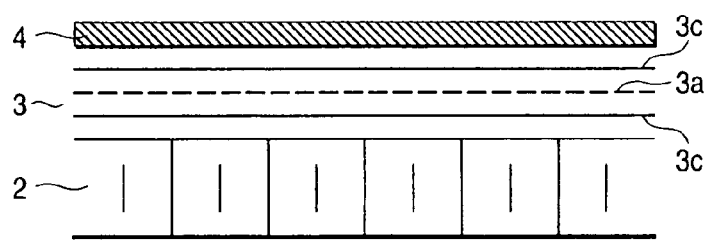
FIG. 5 is a diagram showing still another example of a sealing member for use in the honeycomb sandwich composite panel of FIG. 1.

The sealing member 3 shown in FIG. 5 has a three-layered structure carrying thermosetting adhesive properties, in which an epoxy resin film 3a is sandwiched between epoxy resin adhesive films 3c.

Figure 6:
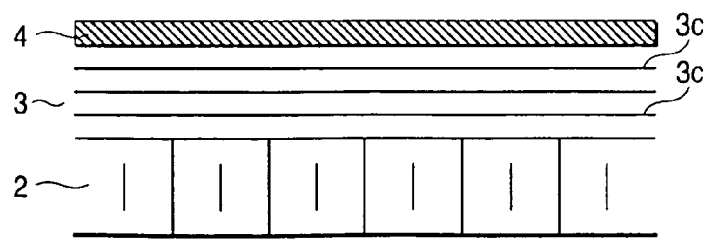
FIG. 6 is a diagram showing yet another example of a sealing member for use in the honeycomb sandwich composite panel of FIG. 1.

The sealing member 3 shown in FIG. 6 is formed of three epoxy resin adhesive films 3c. This sealing membrane can be formed while preventing a decrease in viscosity by controlling temperature increase.

Next, an example of a method of forming the honeycomb sandwich composite panel of this invention is described.

First, dry fabric sheets 4 and a honeycomb core 2 are prepared and dry fabric sheets 4 are stacked on both sides of the honeycomb core 2 with sealing members 3 placed between them as shown in FIG. 1 to form a honeycomb sandwich assembly.

Then, the honeycomb sandwich assembly is set in a molding jig which is not illustrated. A resin impregnating line is connected to the molding jig by ordinary means. The mold containing the honeycomb sandwich assembly is placed inside a hot press or a furnace by an ordinary method, where preparatory steps for molding operation are finished.

Figure 2:
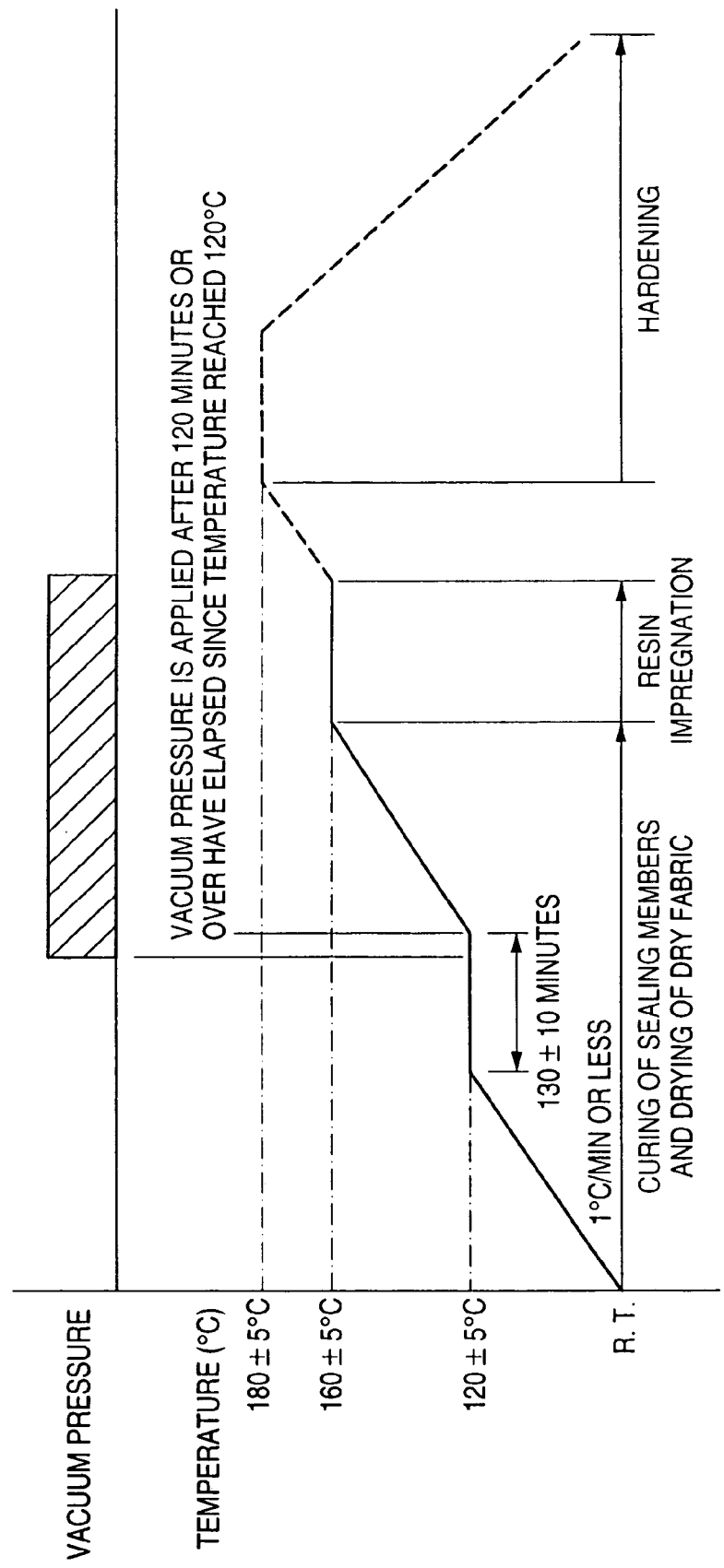
FIG. 2 is a diagram showing a molding procedure according to the method of forming the honeycomb sandwich composite panel of the invention.

Subsequently, heated by the hot press or furnace, the temperature within the internal space of the molding jig is increased up to 120±5° C. at a rate of 1° C. per minute or less and the temperature of 120±5° C. is maintained for a period of 130±10 minutes and, then, the temperature is increased from 120±5° C. up to 160±5° C. at a rate of 1° C. per minute or less, as shown in FIG. 2. Here, the degree of vacuum within the molding jig should preferably be such that its internal space is held at a pressure of −600 mm Hg or less (where the atmospheric pressure is assumed to be 0 mm Hg) after 120 minutes have passed since the temperature reached 120° C. The dry fabric sheets 4 are dried and the honeycomb core 2 is sealed as a result of initial hardening of the sealing members 3 in the above sequence of processing steps. Since the initial hardening of the sealing members 3 and drying operation of the dry fabric sheets 4 are performed simultaneously, it is not necessary to add any new processing step to the ordinary sequence of processing steps for molding solid panels.

When the temperature inside the molding jig has reached 160±5° C., a thermosetting epoxy resin is injected into the molding jig through the impregnating line and the dry fabric sheets 4 are impregnated with the thermosetting resin with the injection pressure held between 2 and 3 atmospheric pressures.

When impregnation of the dry fabric sheets 4 with the thermosetting resin has finished, the temperature inside the molding jig is further increased from 160±5° C. to 180° C. The thermosetting resin impregnated into the dry fabric sheets 4 is hardened by heat at a curing temperature of 180° C. and a pressure equal to or greater than resin impregnating pressure, whereby the honeycomb sandwich composite panel is molded.

Although the thermosetting epoxy resin (curing temperature: 180° C.) is used as the impregnating resin and the epoxy resin film or epoxy adhesive film capable of curing at 180° C. is used as the sealing member 3 in the foregoing embodiment, it has been verified experimentally that sufficient sealing performance and the degree of cure are obtained even when the sealing member 3 is hardened by heat at 120° C. for 60 minutes.

The curing temperature of the sealing member 3 is lower than the temperature at which the impregnating resin is impregnated in the aforementioned embodiment. In a case where the former is higher than the latter, initial hardening of adhesive is performed by increasing the temperature of the sealing member 3 up to an adhesive curing temperature and, then, the temperature is lowered down to the resin impregnating temperature so that the dry fabric sheets 4 are impregnated with the resin.

It is to be pointed out that vacuum pressure is not used in an early stage of heating operation for hardening the sealing member 3, but its hardening is performed at 121±5° C. and the vacuum pressure is used after 120 minutes have elapsed from the beginning of the heating operation.

In a case where the sealing member 3 is an adhesive having a narrow curing temperature range, the temperature of the sealing member 3 is increased up to the curing temperature, and an impregnating process is started upon completion of hardening the sealing member 3. In this case, good sealing performance is obtained if the sealing member 3 is a film which hardens at 180° C., because its heat resistance is sufficiently high. Even when the resin impregnating temperature and resin curing temperatures in succeeding resin impregnating and curing processes are equal to or higher than 120° C., the sealing member 3 is post-cured at that temperature (resin impregnating temperature or resin curing temperature) so that the sealing member 3 can prevent the resin from flowing into the honeycomb core 2.

Further, since the combination of materials of the honeycomb sandwich composite panel using the sealing members 3 is similar to that of a sandwich panel produced by the hand lay-up operation, the sealing members 3 wound not become a dissimilar material with respect to the honeycomb sandwich panel, unlike the moisture barrier film described in Japanese Patent Laid-Open No. 295362/1997.

Experimental results of a flatwise tensile test of the honeycomb sandwich composite panel of the invention are shown in the following table.

TABLE 1

Results of flatwise tensile test

| | | |
|---|---|---|
| Flatwise tensile strength | (1) 0.226 kgf/mm$^2$<br>(2) 0.222 kgf/mm$^2$<br>(3) 0.212 kgf/mm$^2$<br>(4) 0.223 kgf/mm$^2$ | State of fracture:<br>All cores broke down. |
| Sealing efficiency | 95-99% (when resin is present in honeycomb core after impregnation) | |
| Sealing member | Epoxy resin film thermosetting between 120° C. and 180° C. (AF325(M) manufactured by Minnesota Mining Manufacture Company) is sandwiched between adhesive films thermosetting at 180° C. (MB1515-3M manufactured by Sci-Tech Corp.). | |
| Honeycomb core | Nomex-GR. 3.0, thickness 1.0"<br>(E. I. Dupont Company) | |
| Impregnating resin | Epicoat 6003 (Yuka Shell Company) | |
| Dry fabric | Carbon fibers (MIL Standard 3k-70-PW) | |
| Curing temperature of sealing member | 120° C. (120 minutes) | |
| Resin impregnating temperature | 40° C. | |
| Panel hardening temperature | 180° C. | |

It has been verified by the flatwise tensile test that the honeycomb sandwich composite panel has no problem with respect to its strength.

Although the flatwise tensile of the sealing member has not been ascertained since the tensile test was conducted for the honeycomb core, a sufficient adhesive strength is obtained because components of common honeycomb structures employ materials equivalent to those used in the aforementioned test.

Figure 7:
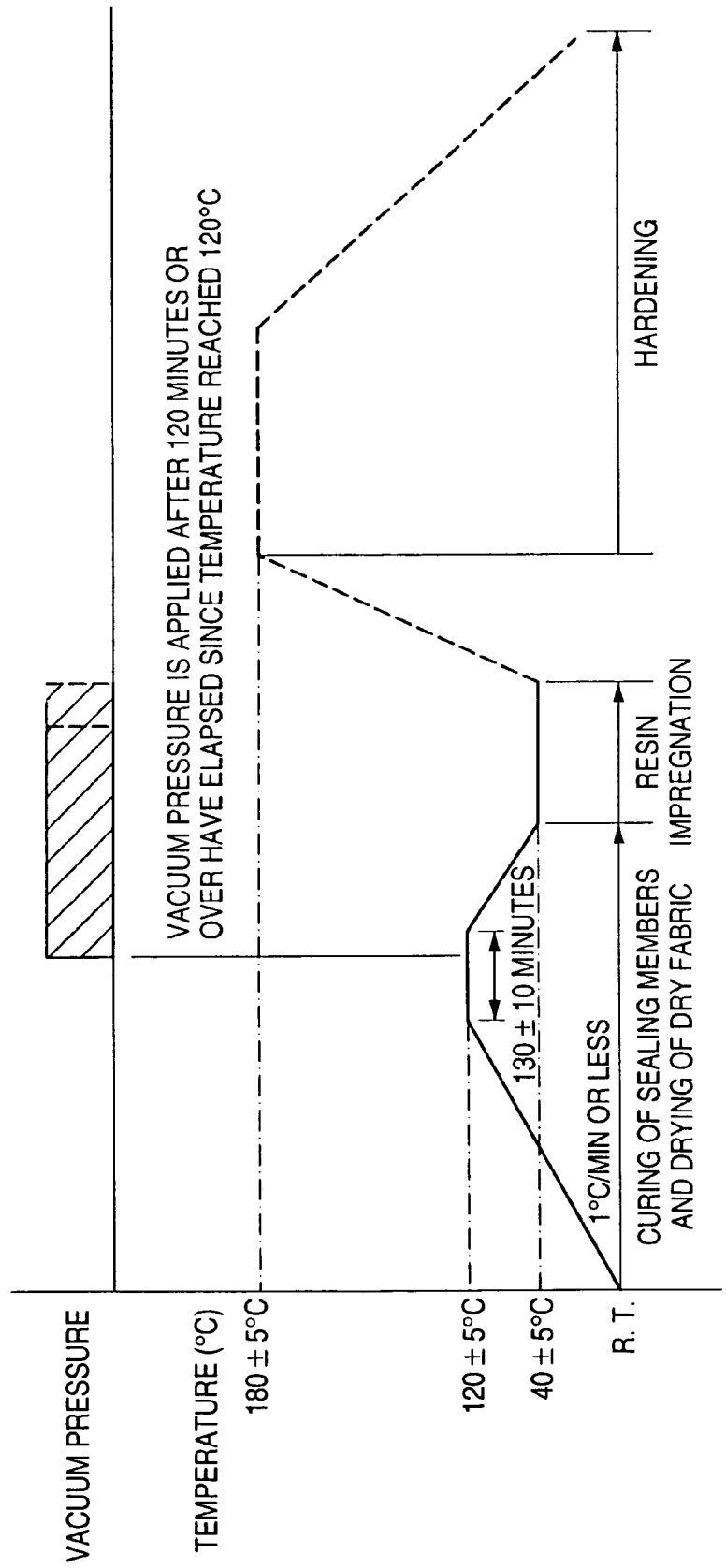
FIG. 7 is a diagram showing a molding procedure according to a method of forming a honeycomb sandwich composite panel in another embodiment of the invention.

FIG. 7 shows a method of forming a honeycomb sandwich composite panel according to another embodiment of this invention.

In the embodiment shown in FIG. 7, a thermosetting epoxy resin adjusted to a low viscosity is used as an impregnating resin and, in a manner similar to the embodiment shown in FIG. 2, dry fabric sheets 4, sealing members 3 and a honeycomb core 2 are prepared and a honeycomb sandwich assembly is formed by stacking the dry fabric sheets 4 on both sides of the honeycomb core 2 with the sealing members 3 placed between them. The honeycomb sandwich assembly is set in a molding jig and a resin impregnating line is connected to the molding jig. The mold containing the honeycomb sandwich assembly is placed inside a hot press or a furnace, where preparatory steps for molding operation are finished.

Subsequently, heated by the hot press or furnace, the temperature within the internal space of the molding jig is increased up to 120±5° C. at a rate of 1° C. per minute or less and the temperature of 120±5° C. is maintained for a period of 130±10 minutes and, then, the temperature is lowered from 120±5° C. to 40±5° C. at a rate of 1° C. per minute or less. Here, the degree of vacuum within the molding jig should preferably be such that its internal space is held at a pressure of −600 mm Hg or less (where the atmospheric pressure is assumed to be 0 mm Hg) after 120 minutes have passed since the temperature reached 120° C. The dry fabric sheets 4 are dried and the honeycomb core 2 is sealed as a result of initial hardening of the sealing members 3 in the above sequence of processing steps. Since the initial hardening of the sealing members 3 and drying operation of the dry fabric sheets 4 are performed simultaneously, it is not necessary to add any new processing step to the ordinary sequence of processing steps for molding solid panels.

When the temperature inside the molding jig has reached 40±5° C., a thermosetting resin is injected into the molding jig through the impregnating line and the dry fabric sheets 4 are impregnated with the thermosetting resin with the injection pressure held between 2 and 3 atmospheric pressures.

When impregnation of the dry fabric sheets 4 with the thermosetting resin has finished, the temperature inside the molding jig is increased from 40±5° C. to 180±5° C. The thermosetting resin impregnated into the dry fabric sheets 4 is hardened by heat at a curing temperature of 180° C. and a pressure equal to or greater than resin impregnating pressure, whereby the honeycomb sandwich composite panel is molded.

Although the temperature at which the thermosetting resin is impregnated is maintained at a constant temperature for a specified period in the aforementioned embodiment, it is possible to eliminate the need for maintaining a constant resin impregnating temperature for a specified period by further reducing the rate of temperature increase.

Furthermore, it is possible to use a single-layered sealing member 3 by reducing the mesh size of its carrier material.

As thus far described, it becomes possible to one-piece mold a honeycomb sandwich composite structure by the RTM technique and produce low-cost honeycomb sandwich components since initial hardening of sealing members for sealing a honeycomb core and drying operation of dry fabric sheets are carried out simultaneously according to this invention.

While the presently preferred embodiments of the present invention have been shown and described, it is to be understood that the disclosure is for the purpose of illustration and that various changes and modifications may be made without departing from the scope of the invention as set forth in the appended claims.

What is claimed is:

1. A method of forming a honeycomb sandwich composite panel by a resin transfer molding process consisting essentially of:
stacking a plurality of thermosetting sealing materials on at least one of sides of a honeycomb; said each of thermosetting sealing materials having an adhesive property, and including one of short fibers of glass and non-woven fabric of glass;
stacking a dry fabric on said thermosetting sealing materials;
hardening said thermosetting sealing materials by heating to a sufficient temperature and maintaining this temperature for a specified period of time;

impregnating the dry fabric with a thermosetting resin; and hardening said thermosetting resin impregnated into said dry fabric by heating said thermosetting resin and said dry fabric to the curing temperature of said thermosetting resin and hot-pressing them for a specified time period.

2. The method of forming a honeycomb sandwich composite panel according to claim 1, wherein:
said thermosetting sealing material is a laminate of three layers.

3. The method of forming a honeycomb sandwich composite panel according to claim 1, wherein:
said thermosetting sealing material is hardened at a temperature lower than the curing temperature of the impregnating resin.

4. The method of forming a honeycomb sandwich composite panel according to claim 1, wherein:
said curing temperature of said thermosetting sealing material is about 120±5° C., and said specified curing time period is about 130±10 minutes.

5. The method of forming a honeycomb sandwich composite panel according to claim 1, wherein:
said thermosetting sealing material is hardened by heating at a rate of 1° C. per minute or less.

6. The method of forming a honeycomb sandwich composite panel according to claim 1, wherein:
said thermosetting sealing material is heated to harden said thermosetting sealing material and to dry said dry fabric simultaneously.

7. The method of forming a honeycomb sandwich composite panel according to claim 1, wherein:
said thermosetting sealing material is hardened by heating said thermosetting sealing material up to the curing temperature of said thermosetting sealing material.

8. The method of forming a honeycomb sandwich composite panel according to claim 1, wherein:
said thermosetting sealing material is a resin film including one of said short fibers of glass and said non-woven fabric of glass to adjust viscosity of said resin film having a sufficient sealing effect to prevent said thermosetting resin from flowing into said honeycomb during said impregnating process.

9. A method of forming a honeycomb sandwich composite panel by a resin transfer molding process consisting essentially of:
stacking a thermosetting sealing material on at least one of sides of a honeycomb; said thermosetting sealing material having an adhesive property, and comprising a plurality of epoxy resin adhesive films and an epoxy resin film placed between said plurality of epoxy resin adhesive films, said epoxy resin film including one of short fibers of glass and non-woven fabric of glass;

stacking a dry fabric on said thermosetting sealing material;

hardening said thermosetting sealing material by heating to a sufficient temperature and maintaining this temperature for a specified period of time;

impregnating the dry fabric with a thermosetting resin; and hardening the resin impregnated into said dry fabric by heating said resin and said fabric to the curing temperature of said thermosetting resin and hot-pressing them for a specified time period.

10. The method of forming a honeycomb sandwich composite panel according to claim 9, wherein:
said thermosetting sealing material is hardened at a temperature lower than the curing temperature of the impregnating resin.

11. The method of forming a honeycomb sandwich composite panel according to claim 9, wherein:
said curing temperature of said thermosetting sealing material is about 120±5° C., and said specified curing time period is about 130±10 minutes.

12. The method of forming a honeycomb sandwich composite panel according to claim 9, wherein:
said thermosetting sealing material is hardened by heating at a rate of 1° C. per minute or less.

13. The method of forming, a honeycomb sandwich composite panel according to claim 9, wherein:
said thermosetting sealing material is heated to harden said thermosetting sealing material and to dry said dry fabric simultaneously.

14. The method of forming a honeycomb sandwich composite panel according to claim 9, wherein:
said thermosetting sealing material is hardened by heating said thermosetting sealing material up to the curing temperature of said thermosetting sealing material.

15. The method of forming a honeycomb sandwich composite panel according to claim 9, wherein:
said epoxy resin film includes one of said short fibers of glass and said non-woven fabric of glass to adjust viscosity of said epoxy resin film having a sufficient sealing effect to prevent said thermosetting resin from flowing into the honeycomb during said impregnating process.

\* \* \* \* \*